United States Patent [19]

Hauschopp et al.

[11] 4,245,736
[45] Jan. 20, 1981

[54] DEVICES FOR ATTACHMENT TO SCRAPER-CHAIN CONVEYORS USED IN MINERAL MINING

[75] Inventors: Alois Hauschopp, Werne; Bernd Steinkuhl, Lünen; Horst Schlusener, Werne, all of Fed. Rep. of Germany

[73] Assignee: Gewerkschaft Eisenhutte Westfalia, Lunen, Fed. Rep. of Germany

[21] Appl. No.: 912,159

[22] Filed: Jun. 2, 1978

[30] Foreign Application Priority Data

Jun. 10, 1977 [DE] Fed. Rep. of Germany ... 7718445[U]

[51] Int. Cl.³ .............................................. B65G 21/10
[52] U.S. Cl. ..................................... 198/735; 198/861
[58] Field of Search ....................... 198/860, 861, 735; 299/32, 43, 34

[56] References Cited

U.S. PATENT DOCUMENTS

| 3,367,718 | 2/1968 | Hauschopp | 198/861 |
| 3,986,600 | 10/1976 | Pentith | 198/735 |
| 4,074,804 | 2/1978 | Gründken | 198/735 |

FOREIGN PATENT DOCUMENTS

| 1055643 | 2/1954 | France | 198/735 |
| 6511050 | 3/1966 | Netherlands | 198/680 |

Primary Examiner—Robert B. Reeves
Assistant Examiner—B. Bond
Attorney, Agent, or Firm—Sughrue, Rothwell, Mion, Zinn and Macpeak

[57] ABSTRACT

An L-shaped device constituting a side or barrier plate for attachment to the side wall of the channel section or pan of a longwall scraper-chain conveyor has connectors at the end regions of a main plate-like body beneath a welded-on upper flange. The connectors have an interengageable projection and recess and possess bores extending parallel to the main plate for receiving fixing bolts. A row of non-circular shaped apertures is provided in the main body and is aligned with the connectors. The row of apertures receive bolts used to secure the device to the channel section or pan. A pair of upstanding webs is fixed to the main body beneath the flange and serve to receive a mounting pin for mounting a guide or shifting ram for example.

5 Claims, 3 Drawing Figures

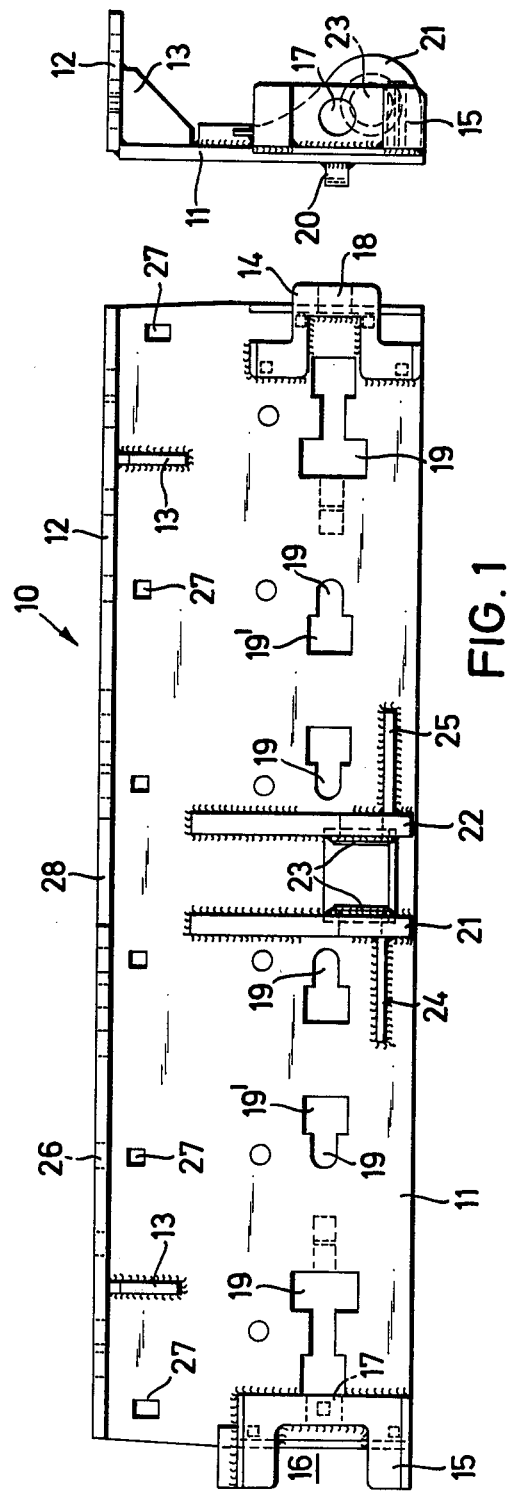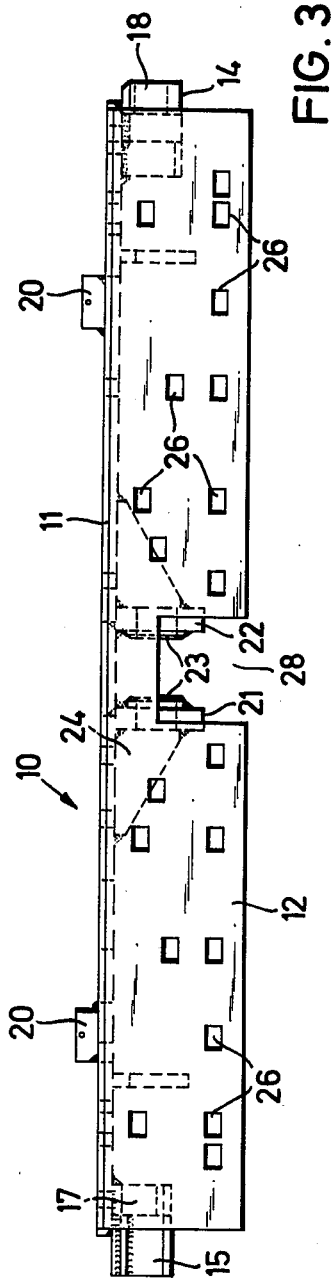

DEVICES FOR ATTACHMENT TO SCRAPER-CHAIN CONVEYORS USED IN MINERAL MINING

BACKGROUND OF THE INVENTION

The present invention relates in general to devices for attachment and use with scraper-chain conveyors in mineral mine workings.

Various attachments are fitted to side walls of the channel sections or pans of scraper-chain conveyors. For example, barrier or spill plates are often secured to the goaf side wall of the pans to increase the capacity of the conveyor and to serve as a support for other equipment, such as conduits or guides. German patent specifications 1955089 and 2042271 describe known forms of attachments.

A general object of the present invention is to provide an improved attachment device which is especially stable and versatile.

SUMMARY OF THE INVENTION

In accordance with the invention an attachment device comprises a main plate, a flange at the upper edge of the main plate extending perpendicularly to the main plate, a row of non-circular apertures in the main plate for receiving connection bolts for securing the device to the channel section side, and connectors attached to the end regions of the main plate beneath the flange, the connectors serving for connecting said device to adjacent similar devices and being generally aligned with the row of apertures. The overall length of the device if preferably the same as the associated channel section or pan to which it is attached. The connectors are preferably complementary in the sense that one has a projection and the other has a recess for receiving the projection. Thus, the device can be connected to adjacent devices by the interengagement of the respective connectors. The interengaging projections and recess can allow limited articulation between the devices and bolts inserted through coaxial holes in the connectors and extending longitudinally of the main plates of the devices can serve to receive the devices and hence the pans together to resist tensile forces. Since the connectors are aligned with the bolts securing the main plates of the devices to their associated conveyor pans, traction forces can be transmitted through the connectors and the main plates to the pans themselves. The device can be additionally strengthened by gusset plates welded between the main plate and the flange. Blocks can be detachably secured to the side of the main plate remote from the connectors to engage in the V-shaped groove usually present in the channel section or pan side wall.

Upstanding ribs can be welded to the central region of the main plate beneath the flange to extend perpendicular thereto. These ribs can have co-axial holes therein for receiving a mounting pin serving as means for connecting a shifting ram and/or guide unit to the device. The shifting ram and/or guide unit can then be connected to a support chock or system arranged alongside the conveyor. An additional web plate attached to the main plate and to one of the ribs can provide rigidity and can restrict movement of the mounting pin at one end. Preferably a releasable locking member can be swung or moved to restrict movement of the other end of the mounting pin.

The apertures of the row of apertures may have larger and smaller regions or portions, similar to a keyhole, permitting the heads of the connection bolts to be inserted through the larger portions. The bolts can then be moved along the apertures to engage with their shanks through the smaller portions while their heads locate on holders welded into or seared in the V-shaped groove of the associated conveyor pan side wall. Additional securing bolts can be provided adjacent the apertures.

The flange and the main plate can also have rectangular apertures for the connection of other items such as conduits, guides, brackets or the like. Square apertures are useful since they can permit adjustment and can lock the connection bolts.

The invention may be understood more readily, and various other features of the invention may become apparent, from consideration of the following description.

BRIEF DESCRIPTION OF DRAWING

An embodiment of the invention will now be described, by way of example, with reference to the accompanying drawing, wherein:

FIG. 1 is a side elevation of an attachment device for a scraper-chain conveyor made in accordance with the invention;

FIG. 2 is an end elevation of the device shown in FIG. 1, and

FIG. 3 is a plan view of the device shown in FIGS. 1 and 2.

DESCRIPTION OF PREFERRED EMBODIMENT

As shown in the drawings, a device 10 for attachment to the side of a scraper-chain conveyor composed of a series of interconnected channel sections or pans has a main body or plate 11 and an upper flange 12. The plate 11 and the flange 12 may be separately formed and welded together to adopt the L-shaped profile shown. To strengthen the device, gusset plates 13 are welded between the flange 12 and the plate 11. The overall length of the device 10 is approximately the same as that of one of the conveyor channel sections or pans.

Connectors 14, 15 are fixed, as by welding, to the end regions of the plate 11. The connectors 14, 15 are of complementary form with the connector 14 having a projection or spigot extending outwardly beyond the plate 11 and the connector 15 having a recess 16 shaped to receive the projection. In this way, the device as illustrated can be mated with a pair of corresponding devices at its ends by interengagement of the connectors 14, 15. The connectors 14, 15 are provided with bores 17, 18 extending longitudinally of the plate 11 and these bores 17, 18 receive bolts (not shown) which are used to secure the devices 10 together. The connectors 14, 15 permit relative articulation between the devices 10 while the bolts resist tensile forces. The connectors 14, 15 lie beneath the flange 12.

Shaped non-circular apertures 19 are arranged in a row along the plate 11 aligned with the connectors 14, 15. The apertures 19 serve to receive connection bolts (not shown) used to secure the device 10 to the side of an associated channel section or conveyor pan. Usually the heads of the bolts would be engaged in the largest portions (19') of the apertures 19 and the heads of the bolts would be moved to engage with barrier plate holders or the like on the side wall of the conveyor channel section or pan which hold the bolt heads captive. The shanks of the bolts would then project from the smaller portions of the apertures 19 to receive washers and nuts. Devices 20 are welded to the rear of the plate 11 to engage in the conventional V-shaped grooves in the channel section side wall to locate the device 10 against the side wall.

Two upstanding ribs 21, 22 are welded to the central region of the plate 10 to extend perpendicularly thereto beneath the flange 12. A cut-out 28 is provided in the flange 12 above the ribs 21, 22. These ribs 21, 22 have concentric holes 23 therein which serve to receive a coupling pin mounting a guide and/or shifting ram (not shown) to the device 10. Additional webs 24, 25 are welded to the ribs 21, 22 and to the plate 11 as shown. The web 24 is somewhat higher than the web 25 and engages the coupling pin—inserted through the holes 23 from the right of FIG. 1—to prevent the pin from moving out of position. A releasable locking member (not shown) can then be operated to retain the pin at the right hand end adjacent the rib 22. Conveniently, this locking member can be supported by the connection bolt or the holder associated with the apertures 19 adjacent to the rib 22.

The flange 12 is also provided with a number of rectangular apertures 26 for permitting items such as conduits, guides or the like to be secured to the device 10. Immediately beneath the flange 12, there are similar rectangular apertures 27 in the plate 11. The apertures 27 at the end regions of the plate 11 can serve to secure an overlapping tongue extending across an adjacent pair of devices 10. The other remaining apertures 27 can also serve to secure conduits, guides brackets or the like to the device 10.

We claim:

1. An attachment for direct mounting to an outer side wall of a channel-section of a scraper-chain conveyor, which outer side wall has a V-shaped groove extending along its length; said attachment being generally of inverted L-shaped cross-section and comprising a main upstanding plate directly engageable with the outer side wall of the conveyor channel-section, an upper flange extending perpendicularly to the main plate and outwardly from the conveyor channel-section, a row of non-circular apertures in the main plate for receiving connection bolts used for securing the attachment to the outer side wall of the conveyor channel-section, connectors located at the end regions of the main plate beneath the flange to project outwardly from the ends of said main plate, the connectors being aligned with the row of apertures and being complementary with one connector having a recess and the other connector having a projection, the recess and projection of the connectors serving to mate with a similar projection and recess, respectively, of further connectors at the ends of adjacent similar attachments, holes in the connectors extending longitudinally of the main plate for receiving bolts used to secure the mating connectors of adjacent attachments together, a pair of upstanding spaced-apart ribs fixed to the central region of the main plate beneath the flange and projecting outwardly from the conveyor channel section, concentric holes in said ribs for receiving a mounting pin serving to connect a shifting ram to the attachment, and blocks fixed to the main plate on the side opposite to the ribs and connectors, said blocks being aligned with said row of apertures and serving to engage within the V-shaped groove of the channel section side wall to additionally lock the attachment thereto, and wherein at least one web is attached to said main plate and one of said spaced apart ribs to restrain movement of the mounting pin located in the holes of said ribs.

2. An attachment according to claim 1, wherein each aperture of said row of apertures has a larger and a smaller portion to facilitate the location of the heads of the connection bolts.

3. An attachment according to claim 1, wherein the flange has rectangular apertures therein.

4. An attachment according to claim 3, wherein the main plate also has rectangular apertures therein immediately beneath the flange.

5. An attachment according to claim 1, wherein strengthening gusset plates are fixed between the main plate and the flange.

* * * * *